Oct. 21, 1952    R. IREDELL    2,614,951
PNEUMATIC TIRE BUILDING DRUM
Filed Feb. 24, 1951    2 SHEETS—SHEET 1

INVENTOR
Robert Iredell
BY Evans & McCoy
ATTORNEYS

INVENTOR
Robert Iredell
BY Evans & McCoy
ATTORNEYS

Patented Oct. 21, 1952

2,614,951

UNITED STATES PATENT OFFICE 2,614,951

PNEUMATIC TIRE BUILDING DRUM

Robert Iredell, Akron, Ohio, assignor to The General Tire and Rubber Company, Akron, Ohio, a corporation of Ohio Application February 24, 1951, Serial No. 212,530

20 Claims. (Cl. 154—9)

This invention relates to the tire building art, more particularly to improvements in the flat band process and an improved building drum incorporating expansible components for distending a ply band placed thereabout. The apparatus can be used to advantage in building pneumatic vehicle tires according to the process disclosed in co-pending application for patent, Serial No. 112,579, filed August 26, 1949.

In the building process referred to, a multiple ply band is supported in the shape of a cylinder and, while so supported, is expanded centrally and uniformly about its entire circumferential extent to provide bead receiving shoulders. The band can be assembled from strip ply material either on the drum or form on which it is expanded or the band can be assembled on one machine or form and transferred to another machine or drum for the expanding operation. Numerous benefits such as simplification of the manufacturing procedure, reduction in the handling of the ply material and economies of space and time are realized when the expansion of the ply band and the assembling of the inextensible bead anchorages with the ply material is performed on the same drum or form on which the strip ply material is assembled in the formation of the ply band.

After the initial expansion of the central portion of the cylindrical ply band and the assembling therewith of the circular bead anchorages received against the shoulders provided by such expansion, a layer of rubber tread stock material is placed about the band. Thereafter the composite tire band, which comprises the cylindrical ply band with the bead anchorages and the rubber tread stock material, is further expanded or distended and vulcanized in the customary bagging and curing operations. An annular air bag or diaphragm is inserted, the tire band is fully distended, and the distended band is placed in a heated mold and cured in the usual manner, the air bag or diaphragm being inflated to hold the tire band against the walls of the mold cavity.

The present invention is concerned with the building of the tire band and has for one of its principal objects the provision of an improved apparatus for building a tire band by expanding the central portion of a cylindrical ply band to provide spaced circumferentially extending shoulders that receive the circular beads. As a preferential arrangement, it is sought to provide tire building apparatus which can be used first in assembling strip ply material of bias cords into a multiple layer ply band of cylindrical form, which can then be used to expand the central portion only of the annular band so formed to provide the circular bead receiving shoulders on the ply band, and which can also be used to support the expanded band while the marginal portions of the latter are wrapped about the positioned anchorages and while rubber tread stock material is wrapped about the ply band to complete the tire band.

Another object is to provide tire building apparatus of the character mentioned which includes a rotatable drum assembly comprising central and end components all of cylindrical character, the central component being expansible independently of the end components to permit distention of the central portion only of a ply band carried by the drum while the end portions of the ply band are disposed about and supported on the end components of the drum. As a specialized version of this aspect of the invention, the central and end components of the drum are all mounted for rotation about a common axis, preferably on a common shaft.

A further object of the invention is to provide tire building apparatus having a multiple component drum mounted on horizontal shaft means, the several drum components being axially slidable toward and away from one another on the shaft means, in combination with bead placing members also mounted on the drum supporting shaft means for axial movement toward and away from one of the drum components. This phase of the invention is particularly concerned with the provision of a multiple component drum which includes a central cylindrical portion that is expansible for distending a ply band in the provision of circular bead receiving shoulders in combination with circular bead placing members that are movable telescopically over the respective end components of the drum in locating and placing inextensible circular bead anchorages carried by such members against the circular shoulders of a ply band supported on and distended by the central component of the drum.

A more specific object of the invention is to provide a ply band expanding drum of generally cylindrical form, the cylindrical surface of the drum comprising a multiplicity of relatively narrow elements having outwardly directed faces substantially equi-distant from and parallel to the drum axis. The contemplated drum incorporates an inflatable member or members, preferably annular in extent and preferably incorporating an air chamber or chambers extending axially throughout the major portion of the axial extent of the expanding part of the drum, for applying distending pressure internally to the drum forming elements. Means is provided for limiting the drum expansion in the establishment of a substantially cylindrical surface of predetermined diameter on the distended drum.

Other objects and advantages pertaining to certain novel design features, structural details and combinations and arrangements of parts are set forth in the following description of a preferred embodiment of the invention. This description is made in connection with the accompanying drawings forming a part of the specification.

Figure 4:
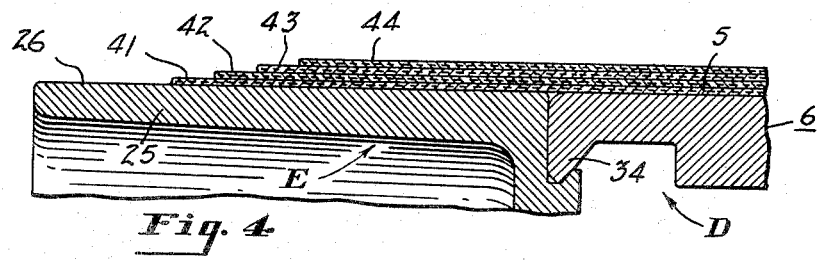
Fig. 4 is a fragmentary sectional detail taken longitudinally through one end of the drum showing a ply band supported on the drum and the interlocking connection between the expansible central drum component and one of the cylindrical end components of the drum.
Figure 5:
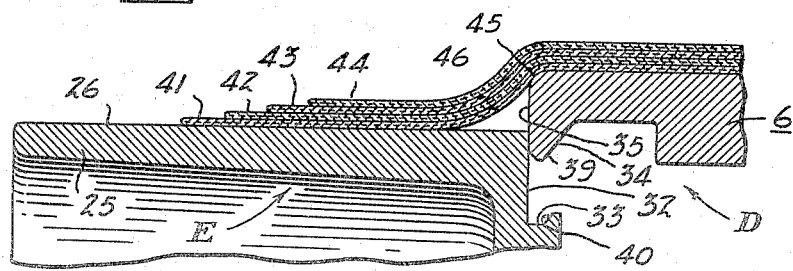
Fig. 5 is a fragmentary sectional detail similar to Fig. 4 showing the relative positions of the parts and the ply band upon expansion of the central drum component.
Figure 6:
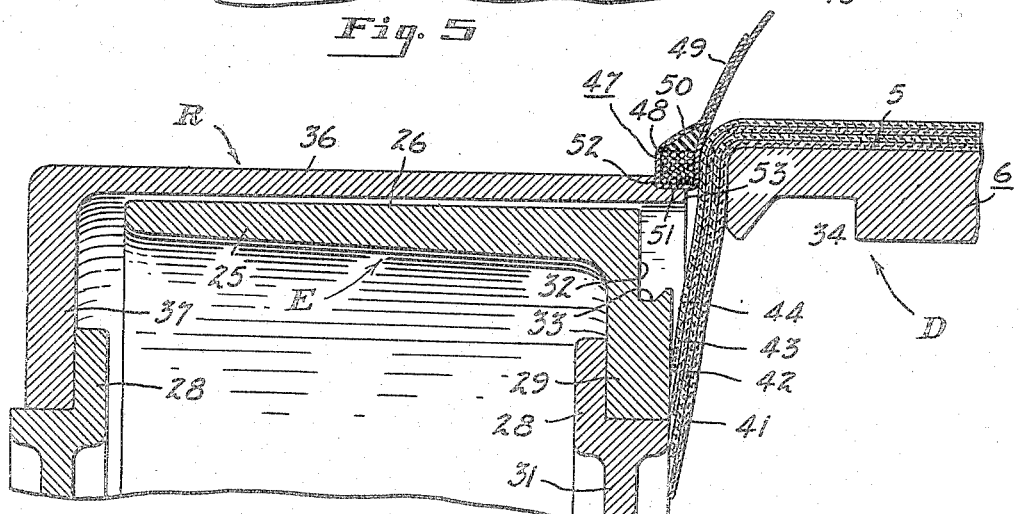
Figure 7:
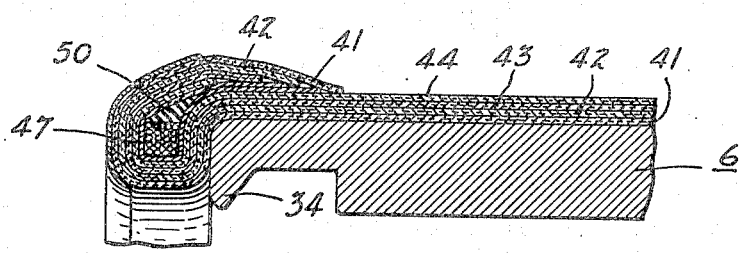

Fig. 6 is a fragmentary sectional detail similar to Figs. 4 and 5 showing a subsequent stage of the process wherein one of the bead placing members is telescoped over the corresponding cylindrical end component of the drum and supports a circular bead anchorage against one of the circumferentially extending shoulders formed on the ply band by distention of the latter on the central drum component; and Fig. 7 is a fragmentary sectional detail similar to Figs. 4 through 6 showing a later stage of the process wherein the several ply material layers constituting one of the marginal portions of the ply band are wrapped about the bead anchorages.

Figure 1:
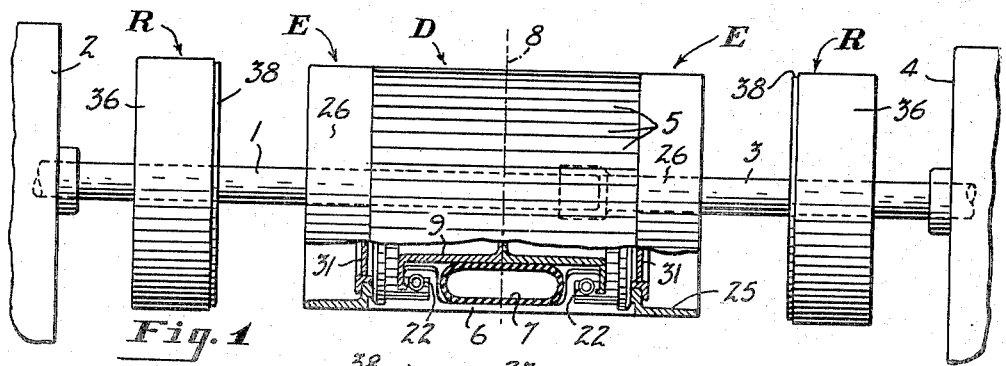
Figure 1 is an elevational view, partly diagrammatic, partly in section and with parts broken away and removed, of the tire building apparatus of the present invention.

The present building drum, indicated generally at D, is supported, as on a shaft 1, for rotation about a substantially horizontal axis. The shaft is journaled in a pedestal or support, indicated at 2, the latter comprising an enclosed frame housing suitable drive mechanism for turning the shaft conventionally. A pair of cylindrical extensions E of equal diameter and a pair of bead placing rings R, also of equal diameter are located at the ends of the drum. The extension E and the ring R at the left end of the drum, as viewed in Fig. 1, are rotatable on and slidable axially of the drum supporting shaft 1. At the right end of the drum, as viewed in the same figure, the extension E and the ring R are supported on a shaft 3 aligned with the shaft 1 and carried by another pedestal or support 4. The shafts 1 and 3 are interfitted at their ends for mutual support. One of the shafts, as for example, the shaft 3, is axially shiftable to separate the shaft ends so that bead ring assemblies can be placed on the rings R and so that a completed tire band can be withdrawn over the free end of the drum thus provided. Such axial shifting of the shaft may be accomplished in several ways, such as by sliding of the shaft in the journals of the pedestal support or by bodily movement of the pedestal on tracks or the like in accordance with conventional practice. Although in the arrangement shown the drum D is supported directly on the cantilever shaft 1 and the shaft 3 is withdrawn axially through the right hand end of the drum, for tire band removal, it is apparent, of course, that the parts may be reversed so that the relatively movable shaft may be withdrawn through the left end of the drum.

Figure 2:
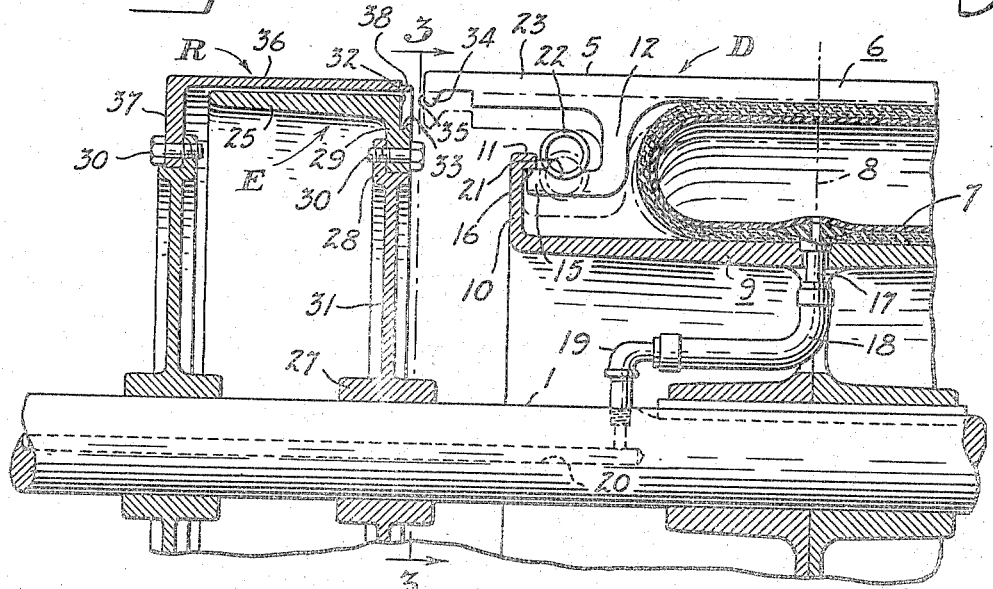
Fig. 2 is a sectional detail, with parts removed and with parts broken away, taken longitudinally through one end of the tire building apparatus, this view being enlarged with respect to Fig. 1.
Figure 3:
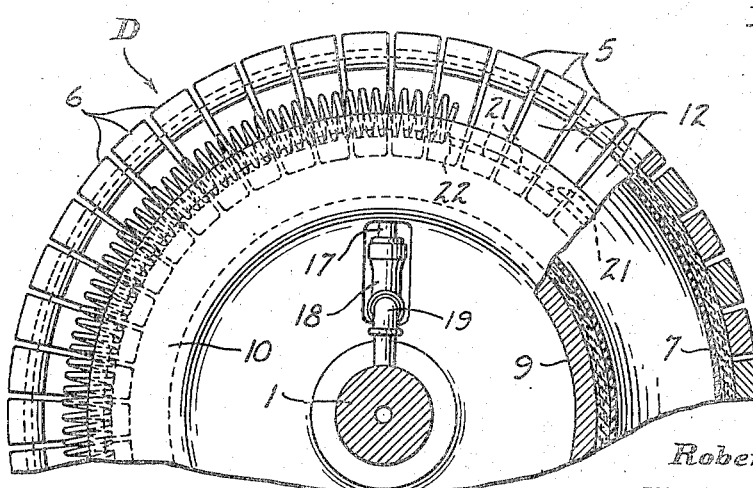
Fig. 3 is a fragmentary elevational view, partly in section and with parts broken away, taken substantially along the line indicated at 3—3 of Fig. 2.

A substantially cylindrical work receiving surface is provided on the drum D by outwardly directed surfaces 5 of a multiplicity of axially elongated segments indicated generally at 6. These segments are individually relatively rigid, being cast of a light metal such as aluminum and their surfaces 5 are either curved circumferentially or are substantially flat, as shown. Each segment is formed with a pair of axially spaced, radially inwardly directed extensions that are received over and embrace the ends of an inflating annulus 7. The drum D is substantially symmetrical not only about its rotational axis but also on opposite sides of its median or central radial plane indicated at 8, Fig. 2, it being understood that the broken away end of the drum in Fig. 2 is of the same construction as the end illustrated and that the extension E and the ring R at the right hand end of the drum are similar in construction to the corresponding parts shown in Fig. 2 at the left hand end of the drum.

The annulus 7 is received in embracing relation about the central portion of the outwardly directed cylindrical face of a cast metal hub 9 keyed or otherwise secured on the shaft 1. Each end of the hub 9 is formed with an integral outwardly directed radial flange 10 having an inturned circumferential lip 11 completely circular in extent. The radially inwardly projecting portions (indicated at 12 of Fig. 2) of the drum segments are spaced inwardly from end faces 35 of the drum so that the ends of the segments extend axially beyond or overhang the hub ends 10.

An angularly disposed foot 15 on the inner end of each of the segment extensions 12 projects axially away from the inflation annulus and is engageable against a circumferential abutment face 16 on the lip 11 of the hub flange 10 to limit radial outward movement of the segments 6 and the drum expansion under the pressure of the annulus 7 when the latter is inflated.

The rubber annulus is fitted with a conventional inflation stem 17 that extends inwardly through an opening in the cylindrical hub 9. A flexible conduit 18 connects the inflation stem 17 to a fitting and conduit 19 that communicates with a suitable source of air under pressure through a passage 20 in the shaft 1. Conventional valves and related controls regulate the admission of air into and the release of air from the annulus 7 for inflating and for venting air from or deflating the latter.

Intermediate its ends, the foot portion 15 at each end of each of the segments 6 is formed with a concave seat 21 that conforms to and receives a resilient contracting element or annulus 22. This contracting annulus desirably takes the form of an endless helical coil spring which is tensioned about the axially extending foot portions 15 of all of the segments so as to hold the latter strongly against the inflation annulus or bag 7. The contracting or garter springs 22, located one at each end of the inflation member 7 but within the axial limits of overhanging end portions 23 of the drum segments, serve to contract the drum segments uniformly against the inflation member in maintaining a substantially cylindrical work surface on the drum D during both inflation and deflation. The compressive force applied to the inflation annulus by the contraction springs also serves to deflate the inflation annulus or air bag when the latter is vented to atmosphere and when it is desired to collapse or reduce the diameter of the drum. The interfitting relation of each contraction annulus 22 and the seats 21 on the segments resists axial displacement of one segment relative to its neighbor and tends to maintain the segments in circumferential alignment.

Each of the drum extensions E comprises a rigid metal ring or annulus 25 having a substantially cylindrical outwardly directed face 26, the face diameter being equivalent to or slightly greater than the minimum diameter to which the drum D contracts upon complete deflation or collapse of the inflation annulus 7, such collapsed condition of the drum being indicated by the broken lines of Fig. 2. The cylinder ring 25 is carried by a circular disc or spider 31 having a central hub 27 slidable along the mounting shaft. Rim 28 on the spider 31 is rabbeted to provide a circumferentially extending seat for receiving and locating a matching surface on radial flange 29 formed integrally on one end of the extension ring 25.

The extension E is arranged on the supporting shaft so that the inwardly directed radial flange 29, secured to the spider rim 28 as by cap screws 30, is adjacent the end of the drum D. The end of each extension E that is thus disposed adjacent the drum D is formed with an annular relief or rabbet 32, undercut or grooved as indicated at 33, to provide an outwardly directed channel that receives depending lugs or fingers 34 on the ends of the drum segments 6.

When the drum is contracted, with the end faces 35 of the segments 6 abutted against the annular radial faces of the extension recesses 32 the segment fingers are received in the ring recesses 33 thereby limiting contraction of the drum and interlocking the parts against axial separation.

Inside faces 39 of the drum element fingers 34 are inclined or disposed at an acute angle to the rotational axis of the drum so as to have a wedging action as they are received in the undercut recess or channel 33 in each of the extension cylinders E. This wedging action draws and holds the extension cylinders E snugly against the end faces 35 of the drum elements 6. Desirably, the channel recess 33 is formed with a side wall 40 also inclined to the rotation axis of the drum at substantially the same angle as the inside faces 39 of the element fingers 34 and so as to match the latter. The inclined faces 39 and 40 can thus slide one on the other without excessive wear during contraction of the drum D.

The bead placing rings R each comprises a rigid cylindrical metal ring 36 having an integral radial flange 37 on one end. The rings R are mounted on the respective supporting shafts for axial sliding movement by means of circular discs or spiders which, as shown and identified by reference numerals, may be of the same construction or even identical to the circular discs of the drum extensions E. The support discs or spiders for the bead placing rings R are so placed on the supporting shafts as to facilitate access to the attaching cap screws 30 which are received through apertures provided in the flange 37 of each of the rings 36. The ends of the rings R remote from the attaching flanges 37 are rabbeted to provide circumferentially extending seats 38 (Fig. 2) that receive and support the annular bead assemblies or anchorages used in the tire building operation.

The present apparatus finds utility in several types of tire building processes. Without the cylinder extensions E, the drum can be employed in the assembly of conventional multiple layer ply bands. It can also be used without the extensions E in the partial expansion of ply bands assembled on other machines and in the placement of beads against such bands so expanded. A particularly advantageous use of the apparatus is in connection with the process of building pneumatic tire bands from strip ply material as disclosed in the application referred to above. The following explanation of this use of the apparatus is made with particular reference to Figs. 4 through 7 of the drawings which are of diagrammatic character and show only a fragmentary portion of the apparatus at one end of the drum. It is to be understood, of course, that the steps and procedures described in connection with the figures referred to are carried on simultaneously at both ends of the drum, the apparatus being symmetric about both the rotational axis and the median plane 8.

The extensions E are assembled with the drum D to provide a substantially cylindrical work surface of the desired axial length and of predetermined diameter at all points along its length. With the drum D expanded by inflation of the rubber annulus 7, as to the position illustrated by the full lines of Fig. 2, the extensions E are moved toward one another along shafts 1 and 3 until they abut the end faces 35 of the drum segments 6. Deflation of the annulus 7 then results in contraction of the drum segments 6 under the influence of the garter springs or contractile elements 22 so that the fingers 34 on the ends of the drum segments seat in the outwardly directed channels or grooves 33 of the extensions E. Inasmuch as one of the extensions E is disposed at each end of the drum D, the drum segments 6 are individually supported at their extreme ends and the outwardly directed faces 5 of the drum segments are disposed parallel to and at a uniform radial distance from the rotational axis of the drum in the provision of a cylindrical work surface of predetermined diameter. The depth of the rabbet 32 in the end of each of the extensions E is so proportioned with respect to the radial depth of the fingers 34 on the corresponding ends of the drum segments 6 that the cylindrical work surface defined by the segment faces 5 is of substantially the same diameter as the cylindrical outwardly directed surfaces 26 of the drum extensions (see Fig. 4).

Upon the cylindrical work surface provided by the drum and the drum extensions the operator, by conventional procedures and using conventional means, places a plurality of layers of bias cut, cord reinforced ply material. These ply layers, suitable for making a four-ply tire, are indicated at 41, 42, 43 and 44 of Fig. 4. The ply layers can be placed one at a time about the building form comprising the drum D and the extensions, or, if desired, the several ply layers can be assembled together in a previous and separate band building operation. A previously built band is slid axially over one end of the drum D while the latter is in a collapsed condition and while the extension E is withdrawn from such end of the drum.

After the ply layers 41, 42, 43 and 44 have been assembled about and centered on the drum in superposed relation, the individual layers being axially offset and staggered with respect to one another, as shown, for example, in Fig. 4, the drum D is expanded by inflation of the annulus 7, this expansion of the drum serving to distend the central portion only of the assembled ply layers. Engagement of the segment fingers 15 against the annular abutment faces 16 of the hub 9 limits the distention or expansion of the drum segments to a predetermined diameter. Thus the annular ply layers are distended to a desired predetermined diameter.

At the ends of the drum, during the expansion, the ply material is drawn about rounded corners 45 of the segments 6 providing annular bead receiving shoulders 46 intermediate the expanded central portion of the ply band which embraces the drum D and the unexpanded end portions of the ply band which embrace the cylindrical surfaces 26 of the extensions E. Thus the central portion of the ply band is enlarged to an increased diameter during the drum expansion, the bias or diagonally disposed cords comprising the individual layers of the ply band moving slightly apart. Those portions of the ply band which project axially beyond the ends of the drum D remain in contacting embracing relation about the cylindrical faces of the extensions E, the radial distention of the central portion of the band being accompanied by a slight drawing in or an axial shifting toward the median plane 8 of the unexpanded end portions of the ply band.

In the case of a building process wherein the several layers of ply material are assembled on a separate form and then transferred to the device of the present invention for partial expansion and bead placement, the drum extensions E need not be employed and may be eliminated. In the process described above and in the patent application referred to above, however, wherein the several layers of ply material are assembled directly on the expansible form, the drum extensions E are employed not only to provide work supporting surfaces of the desired axial length beyond the drum ends, but also to locate and support the individual segments of the multiple part drum so as to provide a drum surface of true cylindrical shape and of predetermined diameter, and to provide a drum co-axially supported with respect to the bead placing rings R.

After the controlled partial expansion or distention of the ply band to a predetermined diameter, and with the drum segments 6 in the relative positions indicated in Fig. 5, the drum extensions E, if used, are withdrawn axially from the drum ends and the marginal portions of the ply band projecting axially beyond the drum ends are turned inwardly, as indicated in Fig. 6. The bead placing rings R, carrying bead assemblies 47 previously mounted thereon, are then moved axially along the supporting shafts to place the bead assemblies against the ply material overhanging the drum shoulders. As shown in Fig. 6, each bead assembly comprises a ring-like bundle of steel wires 48 enclosed in a fabric strip folded about the bundle. The adhered together edges of the fabric strip provide a circumferentially extending flange 49. A filler strip 50 of rubber or the like is included in the bead assembly, being enclosed in the angle between the layers of the fabric strip.

The bead seat rabbet 38 (Fig. 2) on the bead placing ring R provides a cylindrical surface 51 that is received internally of the bead ring to support the latter, and a circumferentially extending radial shoulder 52 engageable against one of the side faces of the bead ring to locate the latter on the bead placing ring and to press the bead against the ply material on one of the end faces 35 of the drum segments 6. As shown in Fig. 6, the bead 47 is of greater axial width than the cylindrical seat 51 so that the bead projects beyond end 53 of the bead ring cylinder 36 thereby insuring positive compressive contact of the bead side face against the ply material on the drum shoulder.

The inherent tackiness of the uncured rubber of the ply material used in the ply layers and in the fabric of the bead flipper or flange 49 causes adhesion between the bead assembly and the ply band so that when the flipper 49 is folded and "stitched" in the conventional manner against the surface of the drum, the bead placing ring R can be withdrawn axially from the drum and the bead 47 remains in the predetermined position in which it has been placed.

After withdrawal of the ring R (and also the extension cylinder E over which the bead placing ring is telescoped during the bead placing operation) the marginal portions of the ply band comprising the layers 41, 42, 43 and 44 are folded or wrapped outwardly about the bead assemblies and are adhered or "stitched" in place by conventional techniques so that the ply band takes substantially the form shown in Fig. 7. A layer of tread stock and such breaker, filler and chafer strips (not shown) as may be desired are then placed about the ply band in accordance with conventional practice.

The placing and enclosing of the beads is accomplished while the drum D is held in its fully expanded condition by the internal pressure within the air bag 7. The air pressure employed is sufficient to hold the ends of the foot portions 15 of the segment extensions 12 seated against the abutment faces 16 on the supporting hub 9. While the pressure is not critical, since an excess is permissible, it is satisfactory to use 40 to 60 pounds per square inch gauge or even as much as 100 pounds per square inch gauge.

To remove the assembled ply band from the drum D, the air is exhausted from the air bag 7, as by venting it to the atmosphere and allowing the bag to contract or be contracted by the garter springs 22 which also draw the drum segments 6 radially inwardly, as to the broken line positions illustrated in Fig. 2. The assembled ply band, thus released, is then withdrawn axially over one end of the drum, the shafts 1 and 3 being separated axially for such purpose. Further treatment of the band to make a pneumatic tire is in accordance with conventional practice and includes the usual final expansion or "bagging" operation and cure or vulcanization in a heated mold.

In accordance with the patent statutes the principles of the present invention may be utilized in various ways, numerous modifications and alterations being contemplated, substitution of parts and changes in construction being resorted to as desired, it being understood that the apparatus shown in the drawings and described above and the particular method set forth are given merely for purposes of explanation and illustration without intending to limit the scope of the claims to the specific details disclosed.

What I claim and desire to secure by Letters Patent of the United States is:

1. In apparatus for making cord reinforced pneumatic vehicle tires by the flat band process, a band expanding drum comprising a support member having an axis of symmetry and means mounting such member for rotation about such axis, a plurality of drum forming elements arranged about the support member in side by side relation, said elements having relatively narrow outwardly directed faces substantially paralleling said axis and substantially equidistant therefrom, said elements each being mounted for bodily movement toward and away from said axis and collectively defining a substantially cylindrical work surface, an inflatable member interposed between the elements and the support member to move the elements radially simultaneously in expanding the drum surface, the elements each having a pair of spaced portions extending radially inwardly toward the rotational axis at opposite ends of the inflatable member and in embracing relation to the latter, means interlocking with the elements to limit the outward movement thereof to restrict the drum surface expansion to a predetermined diameter, and means holding the elements against the inflatable member and adapted to contract the elements and the work surface defined by the elements upon deflation of the inflatable member.

2. In apparatus for making cord reinforced pneumatic vehicle tires by the flat band process, a band expanding drum comprising a support member having an axis of symmetry and means mounting such member for rotation about such axis, a plurality of drum forming elements arranged about the support member in side by side relation, said elements having relatively narrow outwardly directed faces substantially paralleling said axis and substantially equidistant therefrom, said elements collectively defining a substantially cylindrical work surface, an inflatable member interposed between the elements and the support member to move the elements radially in expanding the drum surface, the elements each having a radial portion extending toward the drum axis and formed with an angularly disposed axially directed end, an expansible ring received over the angularly disposed ends on the radial extension portions of the elements yieldingly to contract the elements against the inflatable member, and means engageable with said element ends to limit the expanding movement of the elements in restricting the drum surface expansion to a predetermined diameter.

3. In apparatus for making cord reinforced pneumatic vehicle tires by the flat band process, a band expanding drum comprising a support member having an axis of symmetry and means mounting such member for rotation about such axis, a plurality of drum forming elements arranged about the support member in side by side relation, said elements having relatively narrow outwardly directed faces substantially paralleling said axis and substantially equidistant therefrom, said elements each being mounted for bodily movement toward and away from said axis and collectively defining a substantially cylindrical work surface, an inflatable member interposed between the elements and the support member to move the elements radially simultaneously in expanding the drum surface, the elements each having a pair of spaced portions extending radially inwardly toward the rotational axis at opposite ends of the inflatable member and in embracing relation to the latter, said inwardly extending portions being spaced from the ends of the drum forming elements in the provision of overhanging ends on the drum, means interlocking with the elements to limit the outward movement thereof to restrict the drum surface expansion to a predetermined diameter, and means holding the elements against the inflatable member and adapted to contract the elements and the work surface defined by the elements upon deflation of the inflatable member.

4. In apparatus for making cord reinforced pneumatic vehicle tires by the flat band process, a band expanding drum comprising a support member having an axis of symmetry and means mounting such member for rotation about such axis, a plurality of drum forming elements arranged about the support member in side by side relation, said elements having relatively narrow outwardly directed faces substantially paralleling said axis and substantially equidstant therefrom, said elements collectively defining a substantially cylindrical work surface, an inflatable member interposed between the elements and the support member to move the elements radially in expanding the drum surface, the elements each having a pair of spaced portions extending radially inwardly toward the rotational axis at opposite ends of the inflatable member and in embracing relation to the latter, and expansible rings engaging the inwardly extending portions of the drum forming elements at points spaced axially beyond the ends of the inflatable member yieldingly to contract the elements against the inflatable member.

5. In apparatus for making cord reinforced pneumatic vehicle tires by the flat band process, a band expanding drum comprising a support member having an axis of symmetry and means mounting such member for rotation about such axis, a plurality of drum forming elements arranged about the support member in side by side relation, said elements having relatively narrow outwardly directed faces substantially paralleling said axis and substantially equidistant therefrom, said elements collectively defining a substantially cylindrical work surface, an inflatable member interposed between the elements and the support member to move the elements radially in expanding the drum surface, the elements each having a pair of spaced portions extending radially inwardly toward the rotational axis at opposite ends of the inflatable member and in embracing relation to the latter, means engageable with the inwardly extending portions of the drum forming elements so as to limit the radially outwardly expanding movement thereof in restricting the drum surface expansion to a predetermined diameter, and other means engaging said portions of the elements yieldingly to contract the elements against the inflatable member.

6. In apparatus for making cord reinforced pneumatic vehicle tires by the flat band process, a band expanding drum comprising a support member having an axis of symmetry and means mounting such member for rotation about such axis, a plurality of drum forming elements arranged about the support member in side by side relation, said elements having relatively narrow outwardly directed faces substantially paralleling said axis and substantially equidistant therefrom, said elements collectively defining a substantially cylindrical work surface, an inflatable member interposed between the elements and the support member to move the elements radially in expanding the drum surface, the elements each having a pair of spaced portions extending radially inwardly toward the rotational axis at opposite ends of the inflatable member and in embracing relation to the latter, the inwardly extending portions of the elements having angularly disposed axially directed ends, and expansible rings received over the angularly disposed ends of said inwardly extending element portions yieldingly to contract the elements against the inflatable member.

7. In apparatus for making cord reinforced pneumatic vehicle tires by the flat band process, a band expanding drum comprising a support member having an axis of symmetry and means mounting such member for rotation about such axis, a plurality of drum forming elements arranged about the support member in side by side relation, said elements having relatively narrow outwardly directed faces substantially paralleling said axis and substantially equidistant therefrom, said elements collectively defining a substantially cylindrical work surface, an inflatable member interposed between the elements and the support member to move the elements radially in expanding the drum surface, the elements each having a pair of spaced portions extending radially inwardly toward the rotational axis at opposite ends of the inflatable member and in embracing relation to the latter, the inwardly extending portions of the elements having angularly disposed axially directed ends, expansible rings received over the angularly disposed ends of said inwardly extending element portions yieldingly to contract the elements against the inflatable member and means engageable with said element ends to limit the expanding movement of the elements in restricting the drum surface expansion to a predetermined diameter.

8. In apparatus for making cord reinforced pneumatic vehicle tires by the flat band process, a band expanding drum comprising a support member having an axis of symmetry and means mounting such member for rotation about such axis, a plurality of drum forming elements arranged about the support member in side by side relation, said elements having relatively narrow outwardly directed faces substantially paralleling said axis and substantially equidistant therefrom, said elements each being mounted for bodily movement toward and away from said axis and collectively defining a substantially cylindrical work surface, an inflatable member interposed between the elements and the support member to move the elements radially simultaneously in expanding the drum surface, the elements each having a pair of spaced portions extending radially inwardly toward the rotational axis at opposite ends of the inflatable member and in embracing relation to the latter, means interlocking with the elements to limit the outward movement thereof to restrict the drum surface expansion to a predetermined diameter, means holding the elements against the inflatable member and adapted to contract the elements and the work surface defined by the elements upon deflation of the inflatable member and said inwardly extending portions of the elements being engageable with the support member upon contraction of the drum to limit such contraction to a predetermined minimum work surface diameter.

9. In apparatus for making cord reinforced pneumatic vehicle tires by the flat band process, a band expanding drum comprising a support member having an axis of symmetry and means mounting such member for rotation about such axis, a plurality of drum forming elements arranged about the support member in side by side relation, said elements having relatively narrow outwardly directed faces substantially paralleling said axis and substantially equidistant therefrom, said elements collectively defining a substantially cylindrical work surface, an inflatable member interposed between the elements and the support member to move the elements radially in expanding the drum surface, the elements each having a pair of spaced portions extending radially inwardly toward the rotational axis at opposite ends of the inflatable member and in embracing relation to the latter, the inwardly extending portions of the elements having angularly disposed axially directed ends, expansible rings received over the angularly disposed ends of said inwardly extending element portions yieldingly to contract the elements against the inflatable member, said element portions being engageable with the support member upon contraction of the drum to limit such contraction to a predetermined minimum work surface diameter and means engageable with said element ends to limit the expanding movement of the elements in restricting the drum surface expansion to a predetermined diameter.

10. In apparatus for making cord reinforced pneumatic vehicle tires by the flat band process, a band expanding drum comprising a support member having an axis of symmetry and means mounting such member for rotation about such axis, a plurality of drum forming elements arranged about the support member in side by side relation, said elements having relatively narrow outwardly directed faces substantially paralleling said axis and substantially equidistant therefrom, said elements collectively defining a substantially cylindrical work surface, an inflatable member interposed between the elements and the support member to move the elements radially in expanding the drum surface, the elements each having a pair of spaced portions extending radially inwardly toward the rotational axis at opposite ends of the inflatable member and in embracing relation to the latter, the inwardly extending portions of the elements having angularly disposed axially directed ends, expansible rings received over the angularly disposed ends of said inwardly extending element portions yieldingly to contract the elements against the inflatable member, and said element portions being engageable with the support member upon contraction of the drum to limit such contraction to a predetermined minimum work surface diameter.

11. In apparatus for making cord reinforced pneumatic vehicle tires by the flat band process, a band expanding drum comprising a support member having an axis of symmetry and means mounting such member for rotation about such axis, a plurality of drum forming elements arranged about the support member in side by side relation, said elements having elongated relatively narrow outwardly directed faces disposed with their long dimensions substantially paralleling said axis and substantially equidistant therefrom, said elements each being mounted for bodily movement toward and away from said axis and collectively defining a substantially cylindrical work surface, an inflatable member interposed between the elements and the support member to move the elements radially simultaneously in expanding the drum surface, means carried by the support member and interlocking with the elements to limit the outward movement thereof to restrict the drum surface expansion to a predetermined diameter and to locate the elements with their outwardly directed faces generating a cylinder concentric to said axis of the support member, and means holding the elements against the inflatable member and adapted to contract the elements and the work surface defined by the elements upon deflation of the inflatable member.

12. In apparatus for making cord reinforced pneumatic vehicle tires by the flat band process, a band expanding drum comprising a support member having an axis of symmetry and means mounting such member for rotation about such axis, a plurality of drum forming elements arranged about the support member in side by side relation, said elements having elongated relatively narrow outwardly directed faces disposed with their long dimensions substantially paralleling said axis and substantially equidistant therefrom, said elements each being mounted for bodily movement toward and away from said axis and collectively defining a substantially cylindrical work surface, an inflatable member interposed between the elements and the support member to move the elements radially simultaneously expanding the drum surface, means carried by the support member and interlocking with the elements to limit the outward movement thereof to restrict the drum surface expansion to a predetermined diameter and to locate the elements with their outwardly directed faces generating a cylinder concentric to said axis of the support member, means holding the elements against the inflatable member and adapted to contract the elements and the work surface defined by the elements upon deflation of the inflatable member, and means engageable with the drum forming elements upon contraction of the latter to limit such contraction in restricting the drum surface to a predetermined minimum diameter.

13. Rotary tire building drum construction comprising a substantially cylindrical hub, an expansible and contractible elastic inflatable annulus disposed in embracing relation about the hub, means mounting the hub and the annulus for rotation about a substantially horizontal axis, a multiplicity of drum forming elements disposed in side by side relation about the annulus, said elements being relatively long in the direction of said axis, relatively narrow circumferentially of the annulus and having outwardly directed faces substantially parallel to and radially substantially equidistant from said rotational axis, means engageable individually with each of the elements to limit radial drum expansion movement of the elements, said expansion limiting means locating the drum forming elements at said limit of expansion with their faces substantially in a cylindrical surface of predetermined diameter concentric to said axis and being disposed wholly within the radius of the outwardly directed faces of the elements so that in contracted and expanded conditions of the annulus the elements collectively define a substantially cylindrical work surface substantially unobstructed from end to end of the elements, and means for holding the elements against the annulus.

14. Rotary tire building drum construction comprising a substantially cylindrical hub, an expansible and contractible elastic inflatable annulus disposed in embracing relation about the hub, means mounting the hub and the annulus for rotation about a substantially horizontal axis, a multiplicity of drum forming elements disposed in side by side relation about the annulus, said elements being relatively long in the direction of said axis, relatively narrow circumferentially of the annulus and having outwardly directed faces substantially parallel to and radially substantially equidistant from said rotational axis, means engageable individually with each of the elements to limit radial drum expansion movement of the elements, said expansion limiting means locating the drum forming elements at said limit of expansion with their faces substantially in a cylindrical surface of predetermined diameter concentric to said axis and being disposed wholly within the radius of the outwardly directed faces of the elements so that in contracted and expanded conditions of the annulus the elements collectively define a substantially cylindrical work surface substantially unobstructed from end to end of the elements, and resilient expansible ring means having connection with each of the elements for holding the elements yieldingly against the annulus.

15. Rotary tire building drum construction comprising a substantially cylindrical hub, an expansible and contractible elastic inflatable annulus disposed in embracing relation about the hub, means mounting the hub and the annulus for rotation about a substantially horizontal axis, a multiplicity of drum forming elements disposed in side by side relation about the annulus, said elements being relatively long in the direction of said axis, relatively narrow circumferentially of the annulus and having outwardly directed faces substantially parallel to and radially substantially equidistant from said rotational axis, means engageable individually with each of the elements to limit radial drum expansion movement of the elements, said expansion limiting means locating the drum forming elements at said limit of expansion with their faces substantially in a cylindrical surface of predetermined diameter concentric to said axis and being disposed wholly within the radius of the outwardly directed faces of the elements so that in contracted and expanded conditions of the annulus the elements collectively define a substantially cylindrical work surface substantially unobstructed from end to end of the elements, and a pair of resilient expansible rings each substantially concentric to said rotational axis and disposed one at each end of the annulus, the rings each having connection with each of the elements for holding the elements yieldingly against the annulus.

16. Rotary tire building drum construction comprising a substantially cylindrical hub, an expansible and contractible elastic inflatable annulus disposed in embracing relation about the hub, means mounting the hub and the annulus for rotation about a substantially horizontal axis, a multiplicity of drum forming elements disposed in side by side relation about the annulus, said elements being relatively long in the direction of said axis, relatively narrow circumferentially of the annulus and having outwardly directed faces substantially parallel to and radially substantially equidistant from said rotational axis, means engageable individually with each of the elements to limit radial drum expansion movement of the elements, said expansion limiting means locating the drum forming elements at said limit of expansion with their faces substantially in a cylindrical surface of predetermined diameter concentric to said axis and being disposed wholly within the radius of the outwardly directed faces of the elements so that in contracted and expanded conditions of the annulus the elements collectively define a substantially cylindrical work surface substantially unobstructed from end to end of the elements, and a pair of axially spaced rings having connection with correspondingly spaced portions of each of the elements, the spacing of said rings being greater than the axial extent of the annulus with the annulus disposed between the rings.

17. Tire building apparatus for use in the flat band process comprising a shaft, a hub on the shaft for rotation about a fixed axis, a plurality of drum forming elements disposed about the hub in side by side relation, said elements being relatively long in the direction of said axis, relatively narrow circumferentially of the hub and having outwardly directed faces substantially equidistant from the shaft, said faces of the elements collectively defining a substantially cylindrical working surface, means interposed between the hub and the elements for uniformly moving the latter individually, bodily and radially outward in expanding the working surface, and means engaging the elements individually at a radius less than that of the cylindrical working surface for contracting such surface substantially uniformly about its entire circumferential extent while maintaining the cylindrical surface substantially unobstructed from end to end of the axially elongated elements.

18. Tire building apparatus for use in the flat band process comprising a shaft, a hub on the shaft for rotation about a fixed axis, a plurality of drum forming elements disposed about the hub in side by side relation, said elements being relatively long in the direction of said axis, relatively narrow circumferentially of the hub and having outwardly directed faces substantially equidistant from the shaft, said faces of the elements collectively defining a substantially cylindrical working surface, means interposed between the hub and the elements for uniformly moving the latter individually, bodily and radially outward in expanding the working surface, means engaging the elements individually at a radius less than that of the cylindrical working surface for contracting such surface substantially uniformly about its entire circumferential extent while maintaining the cylindrical surface substantially unobstructed from end to end of the axially elongated elements, and a member mounted on the shaft for movement axially toward and away from one end of the hub, said member having a substantially cylindrical outwardly directed surface concentric to the shaft, said member being receivable within the ends of the drum forming elements and engageable with the elements upon contraction of the latter to limit such contraction to a predetermined working surface diameter.

19. Tire building apparatus for use in the flat band process comprising a shaft, a hub on the shaft for rotation about a fixed axis, a plurality of drum forming elements disposed about the hub in side by side relation, said elements being relatively long in the direction of said axis, relatively narrow circumferentially of the hub and having outwardly directed faces substantially equi-distant from the shaft, said faces of the elements collectively defining a substantially cylindrical working surface, means interposed between the hub and the elements for uniformly moving the latter individually, bodily and radially outward in expanding the working surface, means engaging the elements individually at a radius less than that of the cylindrical working surface for contracting such surface substantially uniformly about its entire circumferential extent while maintaining the cylindrical surface substantially unobstructed from end to end of the axially elongated elements, and a member mounted on the shaft for movement axially toward and away from one end of the hub, said member having a substantially cylindrical outwardly directed surface concentric to the shaft, said member being receivable within the ends of the drum forming elements and engageable with the elements upon contraction of the latter to limit contraction to a working surface diameter substantially equal to the diameter of the cylindrical surface of the axially movable member.

20. Tire building apparatus for use in the flat band process comprising a shaft, a hub on the shaft for rotation about a fixed axis, a plurality of drum forming elements disposed about the hub in side by side relation, said elements being relatively long in the direction of said axis, relatively narrow circumferentially of the hub and having outwardly directed faces substantially equidistant from the shaft, said faces of the elements collectively defining a substantially cylindrical working surface, means interposed between the hub and the elements for uniformly moving the latter individually, bodily and radially outward in expanding the working surface, means engaging the elements individually at a radius less than that of the cylindrical working surface for contracting such surface substantially uniformly about its entire circumferential extent while maintaining the cylindrical surface substantially unobstructed from end to end of the axially elongated elements, and a member mounted on the shaft for movement axially toward and away from one end of the hub, said member having a substantially cylindrical outwardly directed surface concentric to the shaft, said member being receivable within the ends of the drum forming elements and engageable with the elements upon contraction of the latter to limit contraction to a working surface diameter substantially equal to the diameter of the cylindrical surface of the axially movable member, and another member mounted on the shaft for movement axially toward and away from said hub end, said other member having an outer portion receivable telescopically over the first mentioned member and being formed with a circumferentially extending bead receiving seat for supporting an annular bead to locate the latter in predetermined position with respect to a ply material band embracing the drum forming elements.

ROBERT IREDELL.

REFERENCES CITED

The following references are of record in the file of this patent:

UNITED STATES PATENTS

| Number | Name | Date |
| --- | --- | --- |
| 1,634,951 | Mason | July 5, 1927 |
| 2,007,909 | State | July 9, 1935 |
| 2,042,498 | Bostwick | June 2, 1936 |
| 2,084,009 | Sohl | June 15, 1937 |
| 2,145,806 | Schnedarek | Jan. 31, 1939 |
| 2,182,176 | Maranville | Dec. 5, 1939 |
| 2,201,469 | Bostwick | May 21, 1940 |
| 2,313,035 | Breth | Mar. 9, 1943 |
| 2,464,020 | Breth | Mar. 8, 1949 |